United States Patent
Webster

(10) Patent No.: US 8,895,128 B2
(45) Date of Patent: Nov. 25, 2014

(54) SMALL, CIRCULAR DISC FOR THE ATTACHMENT OF PAPERS TO A FLAT SURFACE VIA PUSH PINS

(71) Applicant: Christopher Harrison Webster, Kingwood, TX (US)

(72) Inventor: Christopher Harrison Webster, Kingwood, TX (US)

( * ) Notice: Subject to any disclaimer, the term of this patent is extended or adjusted under 35 U.S.C. 154(b) by 224 days.

(21) Appl. No.: 13/646,379

(22) Filed: Oct. 5, 2012

(65) Prior Publication Data

US 2014/0099467 A1    Apr. 10, 2014

(51) Int. Cl.
    *G09F 7/18*     (2006.01)
(52) U.S. Cl.
    USPC ........................................ 428/66.6; 428/64.1
(58) Field of Classification Search
    CPC .......................................................... G09F 7/18
    USPC ............................................... 428/66.6, 64.1
    See application file for complete search history.

(56) References Cited

U.S. PATENT DOCUMENTS

| | | |
|---|---|---|
| 2,965,978 A | 12/1960 | Olson |
| 3,330,012 A | 7/1967 | Hart et al. |
| 3,952,133 A | 4/1976 | Amos |
| 4,133,123 A | 1/1979 | Anderson |
| 4,319,422 A | 3/1982 | Robins |
| 4,721,644 A | 1/1988 | Mayo |
| 5,096,149 A | 3/1992 | Riese |
| 5,269,485 A | 12/1993 | Dwinell |
| 5,342,665 A | 8/1994 | Krawitz |
| 5,370,487 A | 12/1994 | Kracke |
| 5,730,413 A | 3/1998 | Chen |
| 6,196,782 B1 | 3/2001 | Wagner |
| 6,409,445 B1 | 6/2002 | Beale |
| 6,478,273 B1 | 11/2002 | McKeirnan |

*Primary Examiner* — Alexander Thomas
(74) *Attorney, Agent, or Firm* — William C. Yarbrough, III

(57) ABSTRACT

The present invention is an improved corkboard consisting of a small, circular, moveable and removable tack landing pad which is designed to adhere to a flat surface such as a wall or computer by an adhesive strip or to a metal surface like a refrigerator or thing cabinet via a magnetic strip. This landing pad is designed to receive papers of various sizes, shapes, and stock through puncture with a standard push pin tack without damaging walls. The landing pad consists of two components—(1) an outer donut-shaped shell that is sealed at its base and is contoured inward to a narrowing angle at its tack receiving face and (2) an inner foam core. The outer shell operates to both enclose and compress the foam core. This core compression affords the foam greater tack gripping ability as well as enhanced durability by quickly regaining its original shape upon tack removal.

9 Claims, 4 Drawing Sheets

SMALL, CIRCULAR DISC FOR THE ATTACHMENT OF PAPERS TO A FLAT SURFACE VIA PUSH PINS

BACKGROUND OF THE INVENTION

1. Field of the Invention

The present invention relates to a point of attachment of paper and paper products to a flat surface via a tack landing pad, and more particularly, attachment of multiple sheets and slips of paper of varying shapes, sizes, and stock to a movable and removable, small circular tack landing pad exhibiting a pressurized receiving foam. This attachment is achieved via a push pin that affixes papers to a landing pad where papers may be moved, removed, and reconfigured multiple times without damaging walls or metal surfaces. Additionally, the outer surface of the receiving foam may be covered with an adhering fabric material displaying various depictions. Finally, this invention may also be used as a spinning top.

2. Description of the Related Art

It has long been customary to secure attachment of various sized papers to a "bulletin board" or "cork board" comprised of pressed cork referred to as compound agglomerated, or composition, cork. The cork itself is primarily suberin, a waxy, rubbery material that derives its name from its origin—bark tissue of *Quercus Suber* or cork oak. Once the bark is harvested and processed, finer quality material is used in the production of natural cork products like wine stoppers and lesser quality cork is used for various items including buoys, life preservers, cork flooring, dartboards, safety helmet liners, interiors of golf balls and baseballs, and, as here, for cork boards. During production, the lesser quality cork is ground, treated, and pressed into the desired shape. In addition, certain binders and adhesives are added to the ground cork to give the finished product the desired qualities—softness, resistance to wear, and flexibility. This cork material is a preferred material for the placement and removal of papers via a push pin in that the suberin is elastic and allows for many insertions and removal of a push pin over the life of the cork board.

While the design used in the manufacture of a cork board may vary slightly, the fundamental assemblages have remained relatively consistent over time. The design of a basic cork board or bulletin board is a flat, pressed cork material cut into a rectangular shape that is then framed in wood or metal and placed permanently on a wall. While a rectangular shape is the most conventional, cork may be cut into almost any shape and size and may be framed or unframed. Other materials, such as rubber, may also be used in the construction of a "cork board", but this constitutes a minority of boards overall. What is more, the board may be covered with material that either enhances the ability of the board to grip inserted tack or in some way improves the overall appearance of the board. Placement of papers on the board is achieved by placing the paper at any one of various sections of the board, piercing the paper with a push pin, and puncturing the cork board. This step can be repeated several times at a variety of locations on the board, but cannot receive and re-receive the pin indefinitely without eventually losing the ability to grip. What is more, the inexpensive construction and ubiquitous availability of cork boards begs inexpensive construction. Inevitably, it is this waning ability to grip and cheap manufacture will eventually result in and necessitate board replacement.

As noted above, subtle variations on the main theme have been developed. The cork may be fortified, the board shapes may differ, and the appearance can be augmented. Some inventors have sought to change the means of attachment (i.e. magnetic tack on a metal board), others have designed improved boards, and even others have developed enhanced tack. Yet, while all improvements have advantages over the basic board construction, none provide the unique advantages of the present invention. The following patents are examples of improvements that answer some, but not all, of the concerns addressed by the current invention:

U.S. Pat. No. 1,494,583, issued to Brooks provides the basic backdrop for bulletin board assemblages—a cushion composition of yielding material such as felt, cork, or sawdust ground and cemented with a rubber or elastic cement attached to a non-warpable backing intended to reversibly couple to and uncouple with a tack. As disclosed, the aforementioned bulletin board suffers from the malady of wear over time as discussed above. Multiple tack insertions, over time, leads to a decreased frictional hold on the tack by the board and thereby leads to loss in overall utility. Moreover, the bulletin board requires permanent attachment to a wall (necessitating nail puncture), allows for no attachment to metal surfaces, and takes up a space far in excess of the present invention.

U.S. Pat. No. 2,195,985, issued to Fox, displays an improvement upon the '583 patent in that Fox harbors a sheet of non-porous sponge rubber backed by a layer of stiff card board designed to better grip the tack thus affording a better grasp with lesser incidence of displacement. While exhibiting enhanced gripping ability over the Brooks patent, the Fox patent nonetheless shares in the loss of tack gripping with repeated use, the permanence of placement and immobility in the Brooks patent, and the need for attachment to a wall or similar flat surface resulting in wall damage.

U.S. Pat. No. 7,503,136, issued to McDonald, proffers a bulletin board displaying a map-designed fabric on its outer surface and an improved tack reception through liquid and pressure activated bonding layers. While addressing the aesthetics of bulletin board displays and, to a certain extent, the gripping ability of the tack receiving surface, the McDonald board is still limited in that it fails to ameliorate loss of frictional hold on a tack and, as in previously discussed inventions, cannot be displayed without wall damage.

U.S. Pat. No. 5,342,665, issued to Krawitz, and U.S. Pat. No. 6,780,486, issued to Kuo both evidence yet another variation on the bulletin board theme by presenting an adhesive coating whereby similar paper products may be adhered to a board via an adhesive surface without the use of a tack. And, while the means for paper attachment has been modified, size, permanence, and wall damage remain a limiting factor in these invention's utility.

Clearly a need remains for a tack landing pad that answers the aforementioned deficiencies. The present invention provides a tack landing pad that is space conscious, moveable, removable, and exhibits greater durability and utility over previous cork board constructions. The present invention, as well, is an advancement in cork board design in that it exhibits a greater frictional hold on inserted tack due to the creation of a compressed foam core with which to grasp the tack shaft. Further, the landing pad can be attached to a metal surface via a magnet. Additionally, the landing pad of the current invention has the capability of displaying on its face any number of unique logos, designs and displays. Finally, the landing pad of the current invention can be easily converted into a functional spinning top with a simple manipulation.

SUMMARY OF THE INVENTION

The present invention relates to a home and office organizational tool that consists of a small, circular, moveable and removable tack landing pad having an adhesive or magnetic backing designed for the attachment of various paper sizes and stock to a flat surface via a standard push pin or similarly designed tack. The outer polyurethane ring and snap-in backing operate as a shell that encases a foam core that functions to both enclose and compress the foam core. This core compression affords the foam greater tack gripping ability as well as enhanced durability by quickly regaining its original shape once the tack shaft is removed. This elastic trait gives itself to multiple entrances and exits of the tack shaft without wear and loss of tack gripping ability. Exteriorly, the tack receiving foam's surface is covered by a fabric that may have imprinted upon it any number of designs or images. The fabric itself naturally manifests another resilient feature of the landing pad in that the tack shaft point necessarily moves between the weave of the fabric upon insertion and, upon removal, causes no sign of tack introduction into the pad as the fabric regains its innate state. The last feature of the present invention is in the centered button on one side of the snap-in backing. This button enhances compression of the core when inward facing and acts as an axis for a spinner when outward facing.

It is accordingly an object of the present invention to provide a landing pad and tack system to which varied-sized and stock paper sheets may be placed, replaced, and movably affixed to a clean, smooth, flat surface such as a wall via an adhesive strip.

It is an additional object to provide a means of adhering papers to a flat surface that minimizes damage done to a wall.

It is a another object of this invention to provide a tack and landing pad system to which multiple paper sheets may be adhered to a metal surface such as a refrigerator or filing cabinet via a magnetic backing.

It is an additional object of this invention to use the magnetic backing itself as a means to secure papers to the metallic surface of a refrigerator or filing cabinet.

It is a further object of this invention to proffer a small diameter to which papers may be attached to a flat surface such as a wall or computer.

It is an additional object to provide a tack landing surface that can be punctured and re-punctured repeatedly due to a high density, compressed foam core—thus extending the life and utility of the invention.

It is another object to provide a tack landing pad that can display any number of "silk-screen" depictions including all manner of photographic reproductions, logos, artwork, emblems, scenery, or like portrayals.

It is a further object of this invention where several tack landing pads can be grouped together functionally into a larger "bulletin board" or aesthetically to manifest one image or act as a photomosaic.

It is yet another object to provide a reversible landing pad backing that harbors a small centered, raised "button" that aids in core compression when facing inward and reversibly doubles as a point where the invention can be made into a spinning "top" when to facing outward.

DETAILED DESCRIPTION OF THE PREFERRED EMBODIMENTS

The following detailed description is of the best currently contemplated modes of carrying out exemplary embodiments of the present invention. The description is not to be taken in a limiting sense, but rather is made merely for the purpose of illustrating the general principles of the invention, since the scope of the invention is best defined by the appended claims and diagrams.

Broadly, one embodiment of the present invention provides a tack landing pad that is designed for attachment to a flat surface by means of an adhesive or magnetic strip and is engineered to receive paper of varying size, shape, and stock by insertion of a push pin tack through the papers and into the pad. The point of landing pad attachment is achieved either by an adhesive strip, for attachment to any flat surface, or via magnet, for attachment to a metal flat surface, to the snap-in circular back. The outer shell and snap-in backing serve as a polyurethane "exoskeleton" that both secures an internalized foam core while also exerting pressure on the foam to provide for increased gripping power upon an inserted tack shaft and greater weight bearing capability. The foam core is formed from a thicker, denser foam pad proximal to the point of initial tack reception and a thinner, less dense foam more distal to initial tack insertion that is designed to receive the upward force of the snap-in backing and the downward force of the denser foam thereby increasing the overall pressure within the confines of the polyurethane enclosure. The heightened pressure created within the outer shell results in an increased frictional hold upon inserted tack when the foam core is penetrated by the tacks shaft and allows for foam sealing upon tack removal. As depicted, the present embodiment foam core is two pieces, but future designs may exhibit one foam piece with varying density throughout. In addition to the functional components, the landing pad also manifests one aesthetic feature and one aesthetically functional feature. The former feature is the silk screen fabric that that can be adhered to the denser foam's outward facing surface for the display of any manner of depiction and the latter feature is a raised, centered bubble that purposefully increases pressure upon the foam core when made to face inward and as an axis for a spinning top when facing outward and made to engage a flat, horizontal surface.

Figure 1:
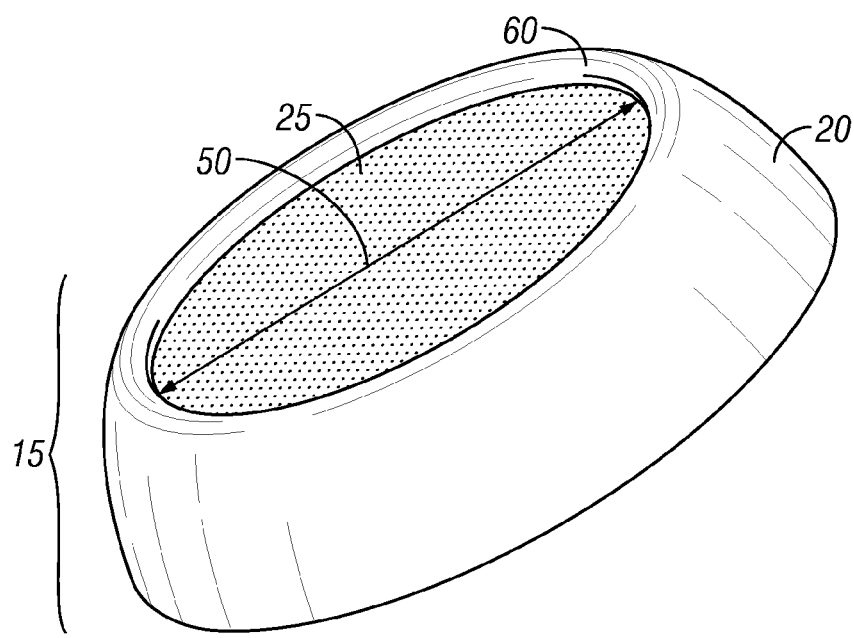
FIG. 1 is an assembled isometric perspective view of the improved tack landing pad.
Figure 2:
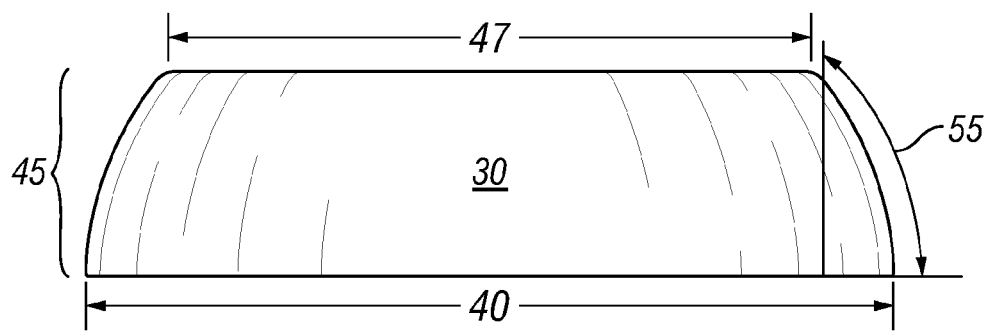
FIG. 2 illustrates the side view of the invention of FIG. 1.
Figure 3:
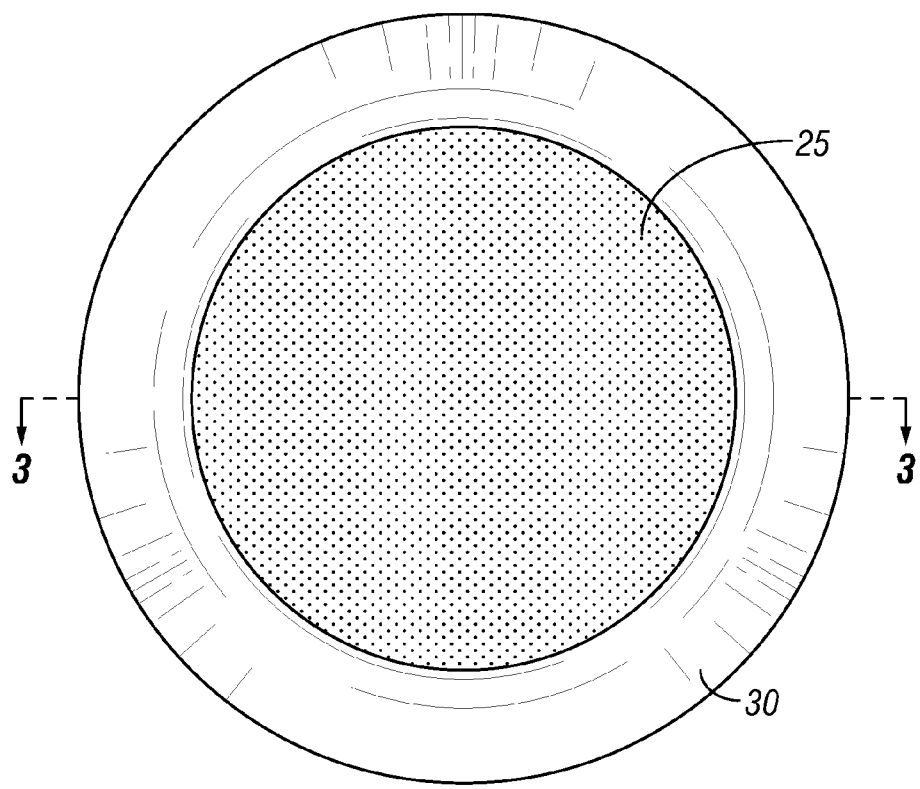
FIG. 3 is an assembled top view of the invention of FIG. 1.
Figure 6:
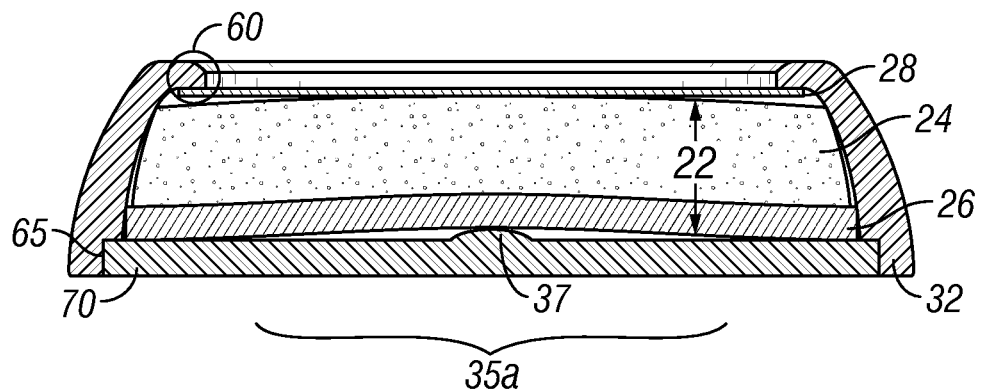
FIG. 6 is an assembled, cross sectional view of the invention along vertical plane 3-3 of FIG. 3.
Figure 7:
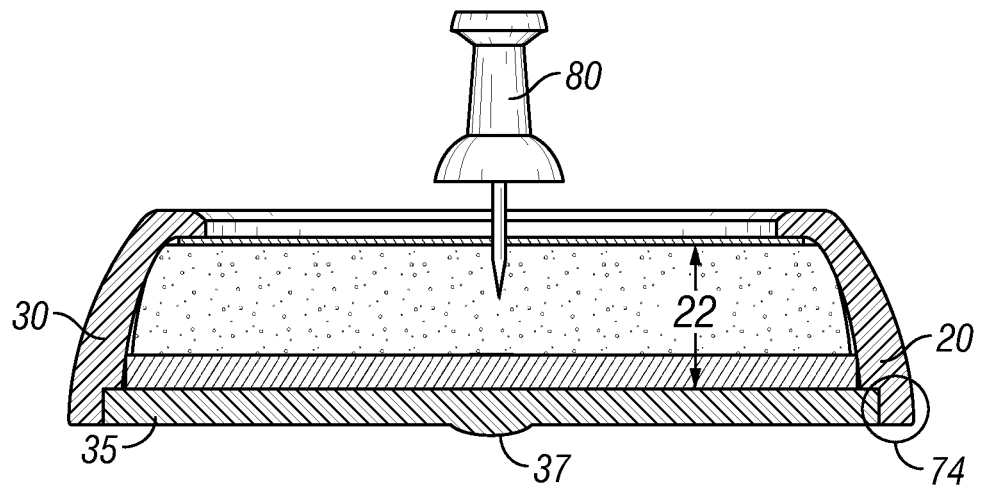
FIG. 7 is a cross-sectional view along vertical plane 3-3 of FIG. 3 with inserted tack.

As depicted, the preferred embodiment is a tack landing pad 15 comprised of two primary components (1) an outer polyurethane shell 20 and (2) an inner foam core 22 (as depicted in FIGS. 1, 6-7). The polyurethane outer shell 20 has two parts—the outer ring 30 and a snap-in backing disc 35 as seen in FIGS. 2, 3, 4, 5 and FIG. 7. The outer ring 30 is an open-faced, donut-shaped band that is 1.75 inches in diameter at the base 40, 0.5 inches high 45, and 1.25 inches in diameter at the top 47, open orifice 50. The height is angled by a curvature 55 0.25 inch reduction from a base diameter of 1.75 inches to 1.25 inches or a 0.25 inch reduction in total diameter on either side that ends with a smooth rounding lip 60 that circumvents the tack receiving portion 25 of the landing pad 15 and braces the foam core 22. This outer shell 20 serves a dual purpose of both encapsulating and securing the inner tack receiving foam 22 while also compressing the foam and thus creating a tighter grip on the inserted tack 80. The snap-in backing 35 is a flat disc that has a 1/64 inch angled grade 65 that matches the opposite angled grade on the 1.75 inch diameter ring base 70. This piece is 1/16 inches in height and 1/8 inch smaller in diameter than the ring base 32. It is this diameter—just slightly smaller than the base diameter of the outer ring 70—that allows for a snug, snap fit. Once in place, the disc is flush with the ring base 74. See FIGS. 1-7.

Figure 4:
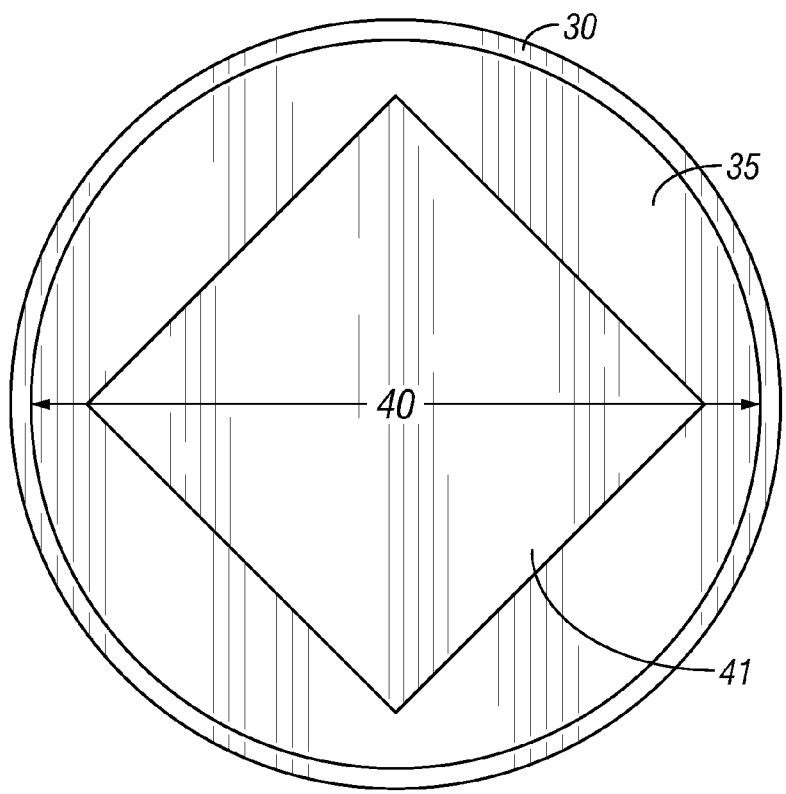
FIG. 4 is an assembled and detailed bottom view of FIG. 1.
Figure 5:
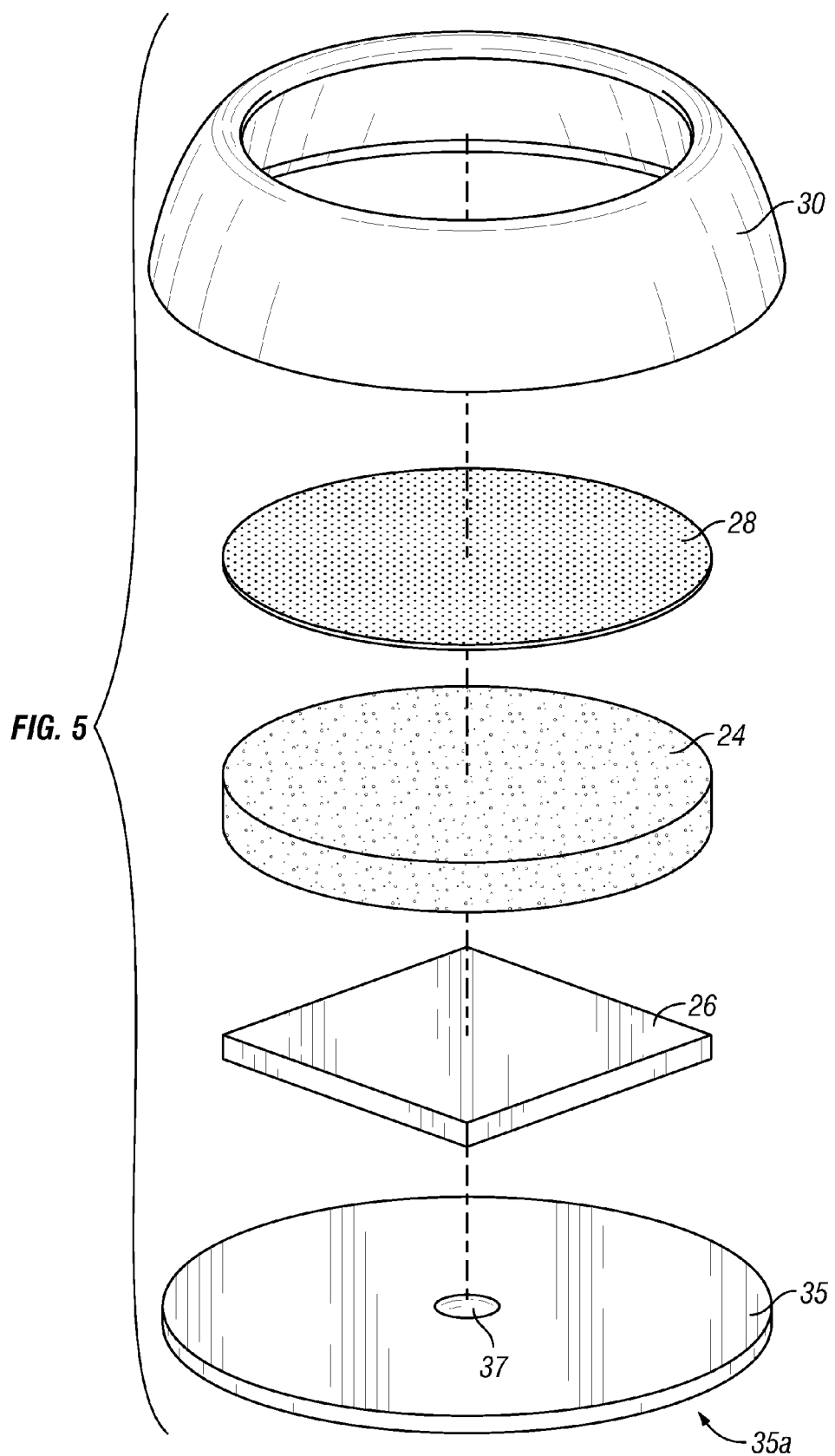
FIG. 5 is a detailed disassembled exploded view of the individual components of the improved tack landing pad invention of FIG. 1.

The circular disc 35 is flat on one side 35a and exhibits a centered, half-sphere shaped bubble 37 that is equidistant from any point of the disc's perimeter (i.e. the disc's radius) on the other side. The bubble 37 is 0.25 inch in diameter and 1/16 inch high. This button 37, when facing inward toward the foam core 22, works to further compress the foam core 22 as in FIG. 6. But, when the disc is reversed, the button faces outward and works as a low profile axis that turns the landing pad 15 into a novelty spinner as in FIG. 7. As can be seen in FIG. 4, an adhesive square or a magnetic strip is place on the flat side 35a of circular disc 35 for securing to a flat surface.

The foam core 22, like the outer shell 20, has two components—a higher density foam disc 24 and a lower density foam square 26. The higher density foam disc 24 is 1.5 inches in diameter and is 1/4 inch in depth. The lesser density foam 26 is a 1 inch by 1 inch square that is 1/8 inch in depth. From the ring base 32, the lower density square foam 26 is directly abutting the snap-in backing disc 35 and the higher density circular foam 24. The higher density foam disc 24 is bordered by the lower density foam 26 square at its base and is encircled by the polyurethane ring 30 at its exposed top surface. It is this outward facing surface of the higher density foam that is designed to receive and exhibit a screen print 28 of any number of logos, designs, emblems, photographic representations, or other various depictions. See FIGS. 5-7.

To operate the invention, the tack landing pad 15 is attached to a flat surface via an adhesive strip 41 attached to the snap-in backing disc 35, desired papers are placed into direct contact with the outward facing foam surface 25, and a tack 80 is pushed through the papers and into the receiving foam 22. To reverse the attachment, the landing pad 15 is held secure and the tack 80 is removed, with papers, from the receiving foam 22. When the surface is metal, the process is identical except the tack landing pad is adhered to the metallic surface by a magnet attached to the backing disc 41. Conversely, when the user desires to create a spinner, the user may simply hold the outer ring 20, press down upon the foam 22, and eject the circular disc 35 from the ring base 32. The disc 35 is then flipped and reinserted into the ring base. Once inserted the disc 35 is flush with the ring base 32 and is a functional "spinning top".

It should be understood, of course, that the foregoing relates to exemplary embodiments of the invention and that modifications may be made without departing from the spirit and scope of the invention as set forth in the following claims.

What is claimed is:

1. A tack landing pad comprising:
   an outer polyurethane ring having a base diameter of 1.75 inches;
   said ring having a top, open portion with a diameter of 1.25 inches;
   said ring having a depth of 0.5 inches;
   said ring having a 1/64 inch angled grade to receive an opposing angled grade of a snap-in backing circular disc; and
   a snap-in backing circular disc
   said disc that is 1/16 inches in height and 1/8 inch smaller in diameter than the base diameter of the polyurethane ring;
   said disc having a 1/64 inch angled grade matching the opposite angle grade on the ring base;
   said ring exhibiting a centered bubble manifested on one flat side that is 0.25 inch in diameter and 1/16 inch high; and
   a foam core having 2 components;
   said foam core comprised of one higher density circular foam disc that is 1.5 inches in diameter and is 1/4 inch in depth;
   said foam core comprised of another lower density foam square that is one inch by one inch an is 1/8 inch in depth; and
   a printable fabric attached to the outer facing surface of the outward facing foam core to reproduce diagrams, pictures, logos, artwork and
   a tack or similar device for puncturing papers and affixing them to the tack landing pad.

2. A tack landing pad of claim 1, wherein said foam core is all one piece.

3. A tack landing pad of claim 1, wherein said snap-in backing circular disc manifests on its flat side an adhesive disc for attachment to a flat surface.

4. A tack landing pad of claim 1, wherein said snap-in backing circular disc manifests on its flat side a magnetic strip for attachment to a metal surface.

5. A tack landing pad of claim 4, wherein the magnet itself may be used to attach sheets of paper to a metal surface.

6. A tack landing pad of claim 1, wherein the centered bubble is inward facing for increased compression upon the foam core.

7. A tack landing pad of claim 1, wherein the centered bubble is outward facing and may be used as an axis by which the landing pad can be used as a "spinning top".

8. A tack landing pad of claim 1, wherein the printable fabric is interchangeable with other printable fabric.

9. A tack landing pad of claim 1, wherein the landing pad is duplicated and replicated to form a larger "bulletin board" from several grouped pads resulting in a larger tack receiving surface area of varying sizes and shapes.

* * * * *